United States Patent [19]

Buerger

[11] 4,007,967
[45] Feb. 15, 1977

[54] LOCKRING, TRIM RING AND MOLDED PLASTIC WHEEL COVER ASSEMBLY

[75] Inventor: Herbert Buerger, Walton, N.Y.

[73] Assignee: Del-Met Corporation, Walton, N.Y.

[22] Filed: July 7, 1975

[21] Appl. No.: 593,779

[52] U.S. Cl. .......................... 301/37 P; 301/37 B; 301/37 R

[51] Int. Cl.$^2$ ......................................... B60B 7/04

[58] Field of Search .......... 301/37 B, 37 R, 37 ST, 301/37 TC, 37 P, 37 T, 37 TP, 37 PB; 29/159 A, 159.01; 72/168

[56] References Cited

UNITED STATES PATENTS

| 2,368,230 | 1/1945 | Lyon | 301/37 R |
|---|---|---|---|
| 2,410,174 | 10/1946 | Lyon | 301/37 R |
| 2,639,948 | 5/1953 | Grimshaw | 301/37 R |
| 2,683,629 | 7/1954 | Lyon | 301/37 R |
| 2,860,012 | 11/1958 | Lyon | 301/37 TP |
| 2,906,559 | 9/1959 | Lyon | 301/37 R |
| 2,964,355 | 12/1960 | Buerger | 301/37 R |
| 3,252,738 | 5/1966 | Huntley | 301/37 P |
| 3,601,449 | 8/1971 | Buerger | 301/37 P |

FOREIGN PATENTS OR APPLICATIONS

| 467,114 | 8/1950 | Canada | 29/159 A |
|---|---|---|---|
| 606,077 | 10/1960 | Canada | 301/37 B |
| 373,972 | 4/1923 | Germany | 29/159.01 |

*Primary Examiner*—Robert B. Reeves
*Assistant Examiner*—Charles A. Marmor
*Attorney, Agent, or Firm*—J. B. Felshin

[57] ABSTRACT

In this assembly the lockring is made from a flat metal strip crimped at regular intervals to curve the strip into a band. The ends of the band are riveted together to form a circular lockring. This lockring has spring fingers which alternate at different angles from one side of the lockring to grip a flange of a wheel tire rim. The lockring is fixed to a metal trim ring which underlies the outer flange of the wheel tire rim. The attached together lockring and trim ring are assembled with a molded plastic wheel cover by pins on the wheel cover passing through spaced openings in the attached together lockring and trim ring, said pins being either headed over or receiving push clips applied thereto.

6 Claims, 9 Drawing Figures

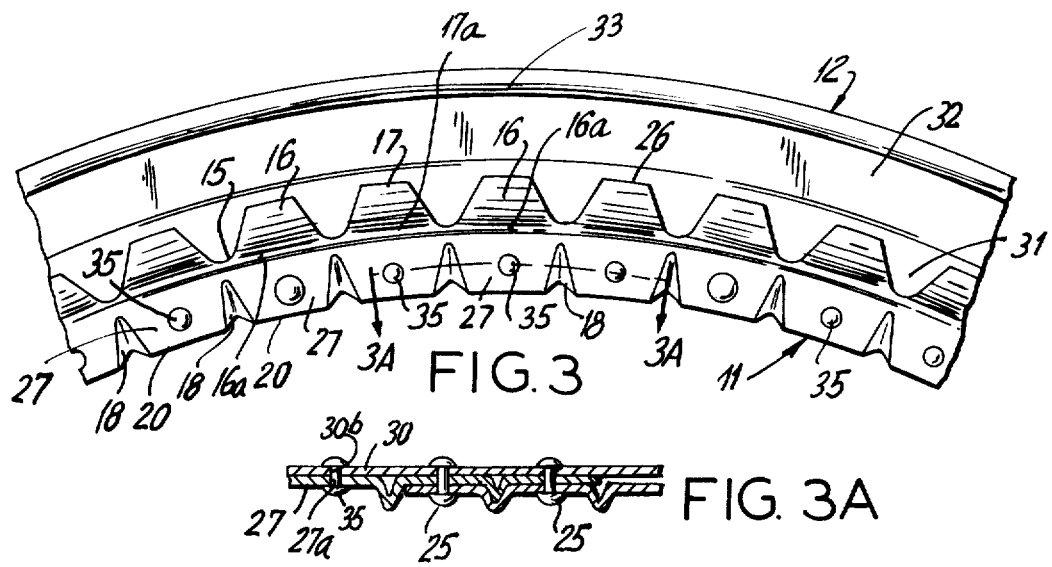
FIG. 3
FIG. 3A
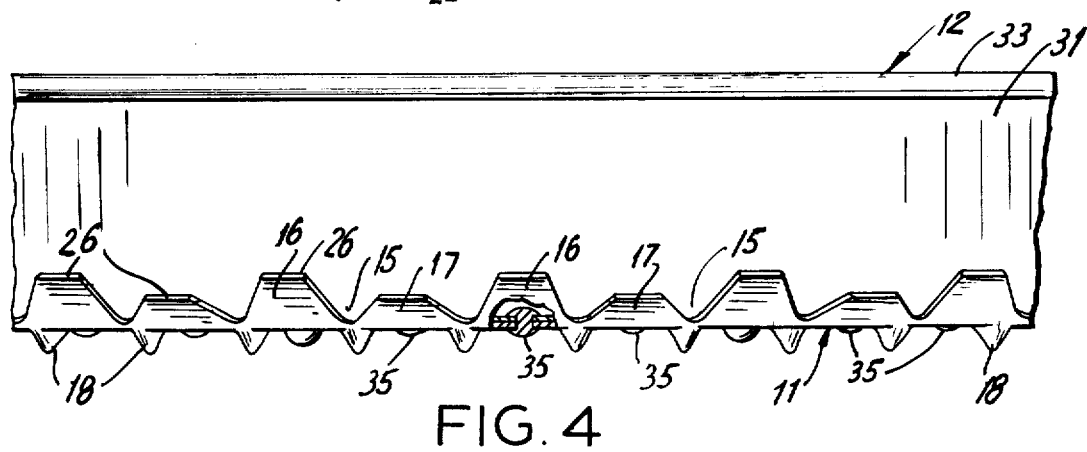
FIG. 4
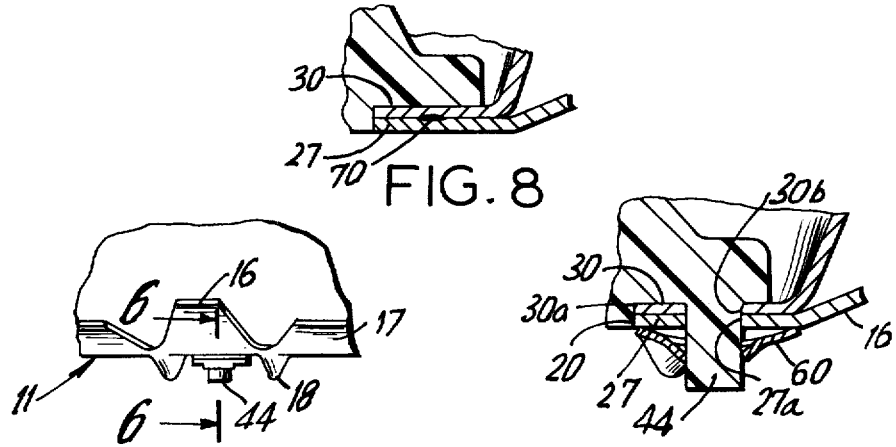
FIG. 8
FIG. 5
FIG. 6
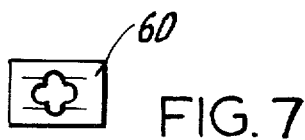
FIG. 7

LOCKRING, TRIM RING AND MOLDED PLASTIC WHEEL COVER ASSEMBLY

This invention relates to lockring, trim ring and molded wheel cover assemblies for automobile wheels.

An object of this invention is to provide an assembly of the character described comprising a lockring fixed to a trim ring which covers the outer flange of a wheel rim, and said attached together lockring and trim ring being attached to a molded plastic wheel cover.

Another object of this invention is to provide in an assembly of the character described, a lockring made from a flat straight metal strip crimped at equiangularly spaced points to curve the strip into a band, the ends of which are riveted together to form a circular lockring, said lockring having spring fingers alternately at different angles to grip the tire rim of a wheel.

Yet another object of this invention is to provide an assembly of the character described, in which the molded plastic wheel cover has pins passing through spaced registering holes in the lockring and trim ring, said pins either being headed or riveted over or said pins receiving push clips mounted thereon.

Still another object of this invention is to provide an assembly of the character described in which the lockring and trim ring are attached together either by rivets or by spot welding located centrally with respect to the fingers.

A further object of this invention is to provide an assembly of the character described in which the pins on the wheel cover and the points of attachment of the lockring and the trim ring are in a common circle.

Yet a further object of this invention is to provide a strong, rugged and durable assembly of the character described which shall be relatively inexpensive to manufacture, easy to apply and which shall yet be practical and efficient to a high degree.

Other objects of this invention will in part be obvious and in part hereinafter pointed out.

The invention accordingly consists in the features of construction, combinations of elements, and arrangement of parts which will be exemplified in the construction hereinafter described and of which the scope of invention will be indicated in the following claims.

IN THE DRAWINGS:

FIG. 3 is a partial plan view of the assembled lockring and trim ring looking toward the lockring;

FIG. 3A is a cross-sectional view taken on line 3A—3A of FIG. 3;

FIG. 4 is a partial radial view of the assembled lockring and trim ring looking radially inwardly;

FIG. 5 is a partial enlarged view of part of the assembled lockring, trim ring and molded plastic wheel cover showing a pin on the cover passing through registering openings in the lockring and trim ring, and a push clip mounted on the pin;

FIG. 6 is a cross-sectional view taken on line 6—6 of FIG. 5;

FIG. 7 is a top view of a push clip; and

FIG. 8 is a cross-sectional view through the wheel cover, lockring and trim ring with the lockring and trim ring attached together by spot welding.

Figures 1, 2:
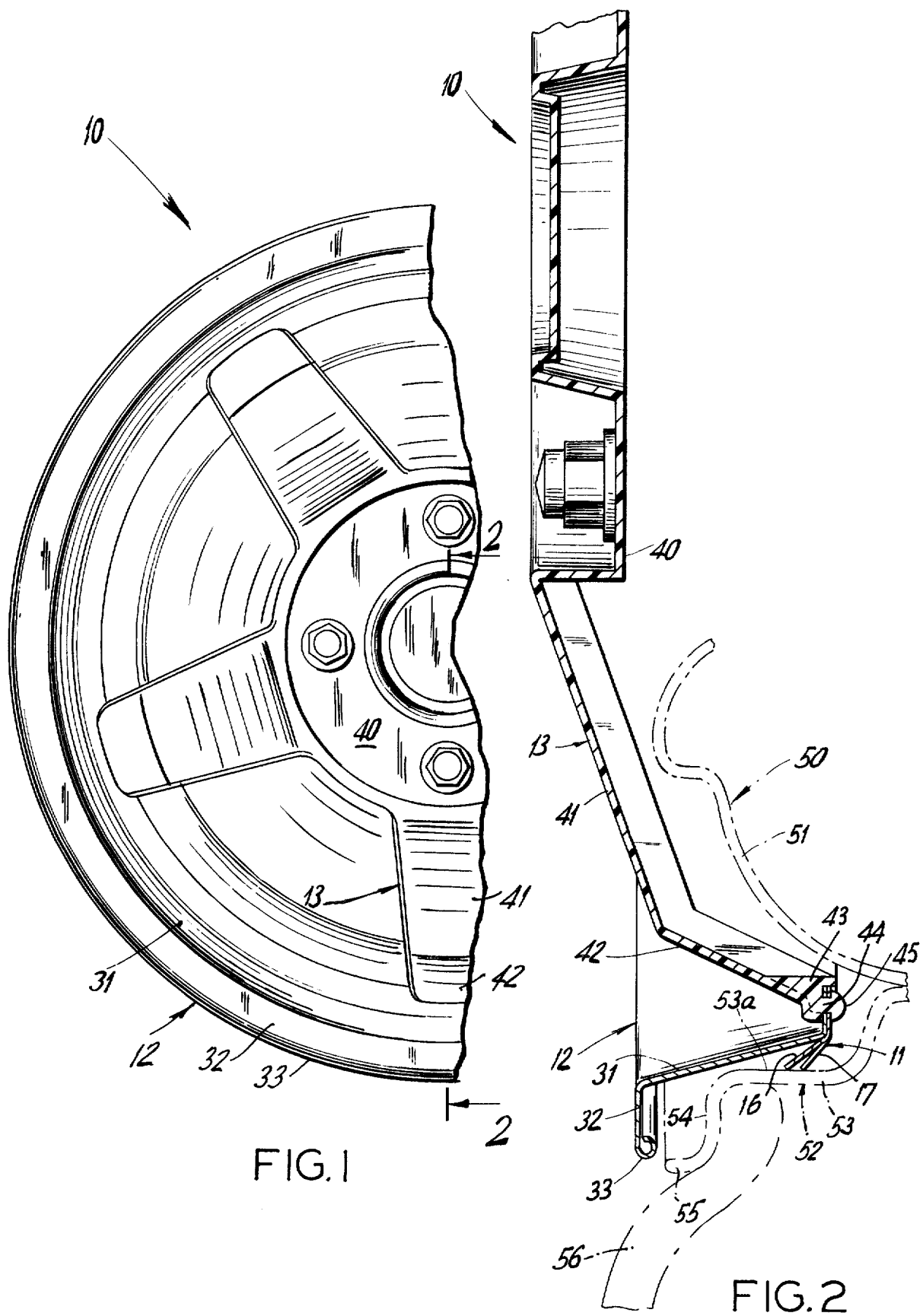
FIG. 1 is a partial front view of the assembly embodying the invention.
FIG. 2 is a cross-sectional view taken on line 2—2 of FIG. 1.

Referring now in detail to the drawing, 10 designates an assembly embodying the invention. Said assembly comprises a lockring 11 attached to a trim ring 12 and both attached to a molded plastic wheel cover 13.

The lockring 11 is made from a straight flat metal strip of uniform width, which is die cut with notches 15 at one edge, equally spaced apart to form alternating fingers 16, 17 extending from one side of the strip. The fingers 16, 17 are bent at 16a, 17a to different angles to the main body of the strip. The fingers 16 are bent to a greater angle to the plane of the body of the strip than are fingers 17.

The body of the flat strip is also crimped progressively in alignment with the notches and between the fingers 16, 17, as at 18, transversely of the strip. The crimps 18 are all to a side of the strip, opposite to the side to which the fingers 16, 17 are bent. The crimps 18 are of least depth and width where they are closest to the notches 15 and increase in depth and width toward the edge 20 of the strip. The crimps are triangular in shape.

The progressive crimping of the strip causes the strip to curve into a band. The ends of the band are overlapped and attached together by a pair of rivets 25 to form a circular lockring. The edge 26 of the strip comprise the outer edges of fingers 16, 17. The closer the crimps are, and the deeper the crimps are, the smaller the diameter of the lockring. It will be understood that the portions 27 of the strip between the crimps 18, and between the bends 16a, 17a and the edge 20, are all in a common plane.

The trim ring 12 is made of metal and comprises an annular flange 30 which overlies the portions 27 of the lockring and the crimps 18. The crimps 18 project away from the flange 30. Extending from the flange 30 is a frusto-conical radially and axially outwardly extending annular wall 31, from the outer end of which there extends radially outwardly, an annular flange 32 in a vertical plane. The outer end of the flange 32 is rolled axially inwardly as at 33. Flange 30 has a radially inwardly extending edge 30a. Flange 30 and portions 27 are formed with registering holes 30b, 27a, centered with respect to portions 27 and the fingers 16, 17. Rivets 35 pass through registering opening 27a, 30b to attach the lockring 11 to the trim ring 12. Rivets 25 pass through registering openings in the overlapped portions of the lockring and in matching openings in the flange 30 of the trim ring.

It will be noted that the rivets 35 are not employed in every fourth set of matching holes 27a, 30b. Each fourth registering hole is reserved for attaching the molded plastic wheel cover 13 to the attached together lockring and trim ring.

The number of rivets 35 between the registering holes reserved for attachment to the wheel cover may be varied if desired.

The wheel cover 13 has a central portion 40 from which an annular portion 41 extends radially outwardly and axially inwardly. Portions 40, 41 may be of any desired decorative shape. Extending radially outwardly and axially inwardly from portion 41 is a frusto conical portion 42 which is disposed within the confines of portion 31 of the trim ring. At the outer rim edge of said portion 42 is a thickened outwardly extending annular flange 43 formed with integral axially inwardly extending spaced pins 44 passing through said reserved openings 27a, 30b. Said pins 44 may be headed or riveted over as at 45, against the inner surface of portions 27 of the lockring to firmly affix the wheel cover to the attached together lockring and trim ring.

The assembly of lockring 11, trim ring 12 and wheel cover 13 may be applied to a tire rim of an automobile wheel 50 of usual construction.

Such wheel comprises a hub 51 attached to a tire carrying rim 52 of known shape. Said rim 52 has an annular cylindrical wall 53 extending axially outwardly. Extending radially outwardly from annular wall 53 is a wall 54 terminating in a curved flange 55 extending axially outwardly.

In applying the assembly 10 to the wheel, the outer edges 26 of the spring fingers 16, 17 scrape against the inner surface 53a of annular wall 53 to cause the spring fingers to bend and flex and resiliently press against wall 53 to hold the assembly 10 to the wheel. It will be noted that the trim ring 11 underlies and covers the walls 53, 54 and flange 55 of the tire rim for the tire 56.

The diameter of rolled-in portion 33 of the trim ring is substantially similar to the diameter of and lies close to the outer edge of the flange 55.

In FIGS. 5 and 6 there is shown a modification. Instead of the pin 44 being headed or riveted, as at 45, a push clip 60 is pushed onto the pin 44 and against the underside of portion 27 of the lockring.

In another modified form of the invention, the rivets 35 may be replaced by spot welding as at 70 in FIG. 8. Thus the holes for the rivets 35 may be omitted, and only the holes for the pins 44 are punched in the trim ring and lockring.

It will thus be seen that there is provided a device in which the several objects of this invention are achieved and which is well adapted to meet the conditions of practical use.

As various possible embodiments might be made of the above invention, and as various changes might be made in the embodiment above set forth, it is to be understood that all matter herein set forth or shown in the accompanying drawings is to be interpreted as illustrative.

I claim:

1. A lockring made from a flat straight strip of metal, and comprising a band of metal formed with transverse notches opening to one edge of the band and providing spring fingers between the notches, and also provided with transverse equiangularly spaced crimps increasing in depth toward the opposite edge of the band to cause said straight strip to curve into a circular band shape, the portions of the band between the crimps being in a common flat plane of said flat strip, the ends of said strip being overlapped and attached together to hold said crimped strip in circular band shape, a trim ring having a flange in a flat plane contacting said flat portions of said lockring, a plastic wheel cover having a flange in a flat plane contacting the flange of said trim ring, and means to attach said flanges of said trim ring and wheel cover to said flat portions of said lockring, said spring fingers being bent to one side of the plane of said flat portions, and said crimps extending to an opposite side of said plane of said flat portions, alternates of said spring fingers being bent to different angles relative to said flat portions.

2. The combination of claim 1, said crimps being aligned with said notches.

3. The combination of claim 2, said trim ring comprising a radially and axially outwardly extending frusto-conical portion, extending from said flange of said trim ring, and a radially outwardly extending flange at the outer end of said frusto-conical portion of said trim ring.

4. The combination of claim 3, said wheel cover having a portion extending from said flange of said cover and disposed within said frusto-conical portion of said trim ring.

5. The combination of claim 1, said means to attach said flanges of said trim ring and wheel cover to said lockring comprising rivets passing through registering openings in said flanges of said trim ring and wheel cover and in said flat portions.

6. The combination of claim 1, said portions of said lockring lying in a common flat plane forming an annular flange, said means for attaching said flanges of said lockring and trim ring to the flat portions of said wheel cover, comprising pins extending from said flange of the wheel cover and passing through openings in the flanges of said lockring and trim ring.

* * * * *